May 9, 1950 C. CHADWICK 2,506,994
PNEUMATICALLY OPERATED RIVET FEED
Filed Aug. 21, 1944 3 Sheets-Sheet 2
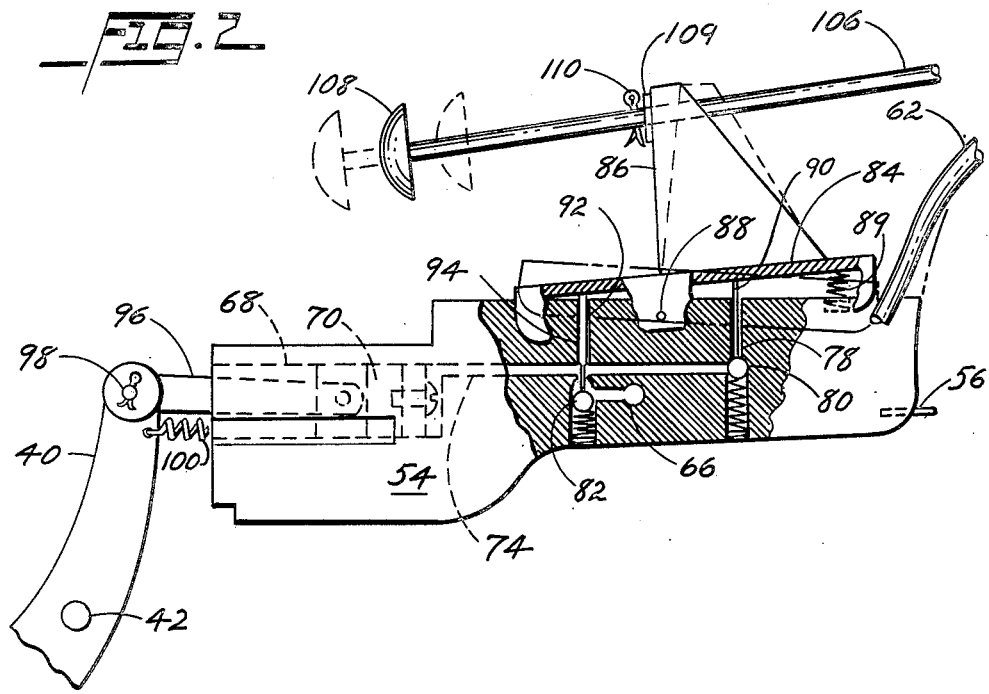
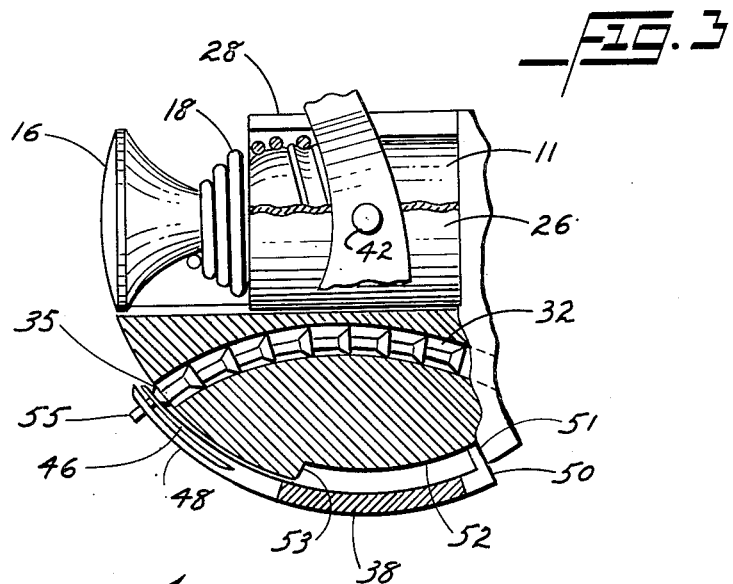
INVENTOR.
CHARLES CHADWICK
BY J Edwin Coates
ATTORNEY May 9, 1950        C. CHADWICK        2,506,994
PNEUMATICALLY OPERATED RIVET FEED
Filed Aug. 21, 1944        3 Sheets-Sheet 3
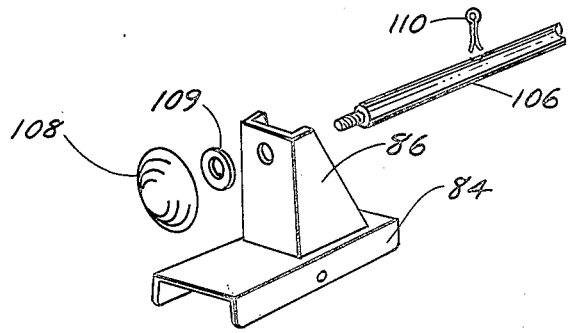
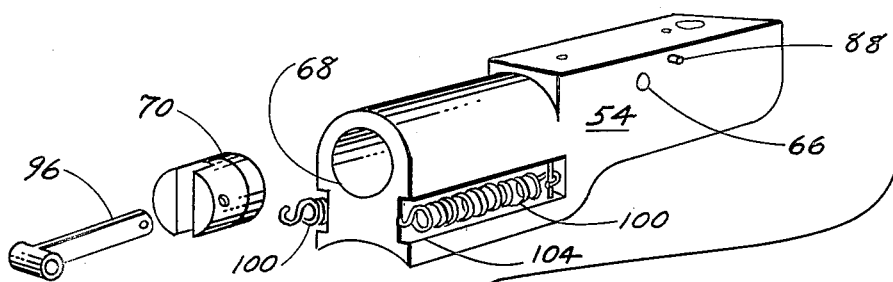
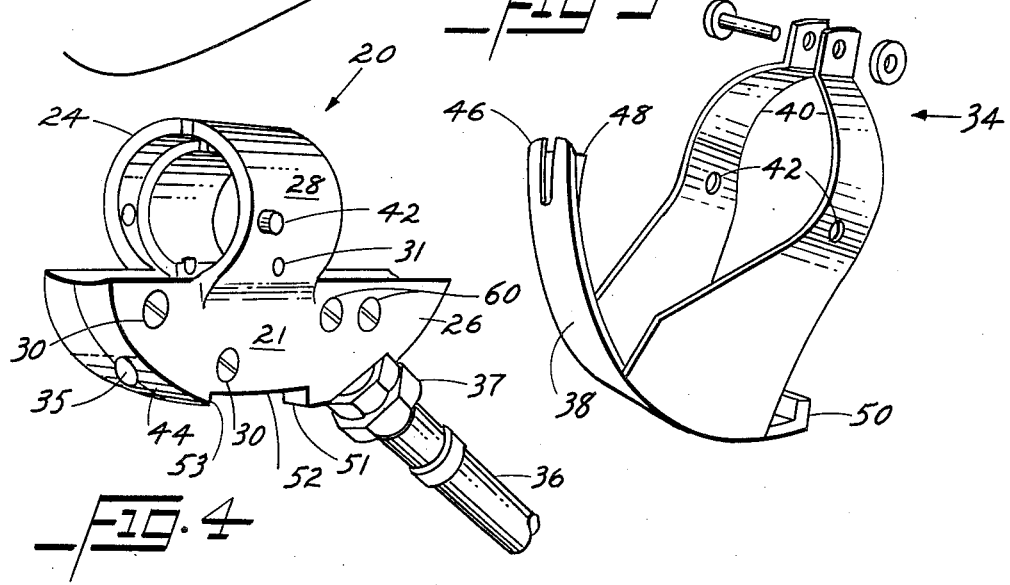
INVENTOR.
CHARLES CHADWICK
BY J Edwin Coates
ATTORNEY Patented May 9, 1950

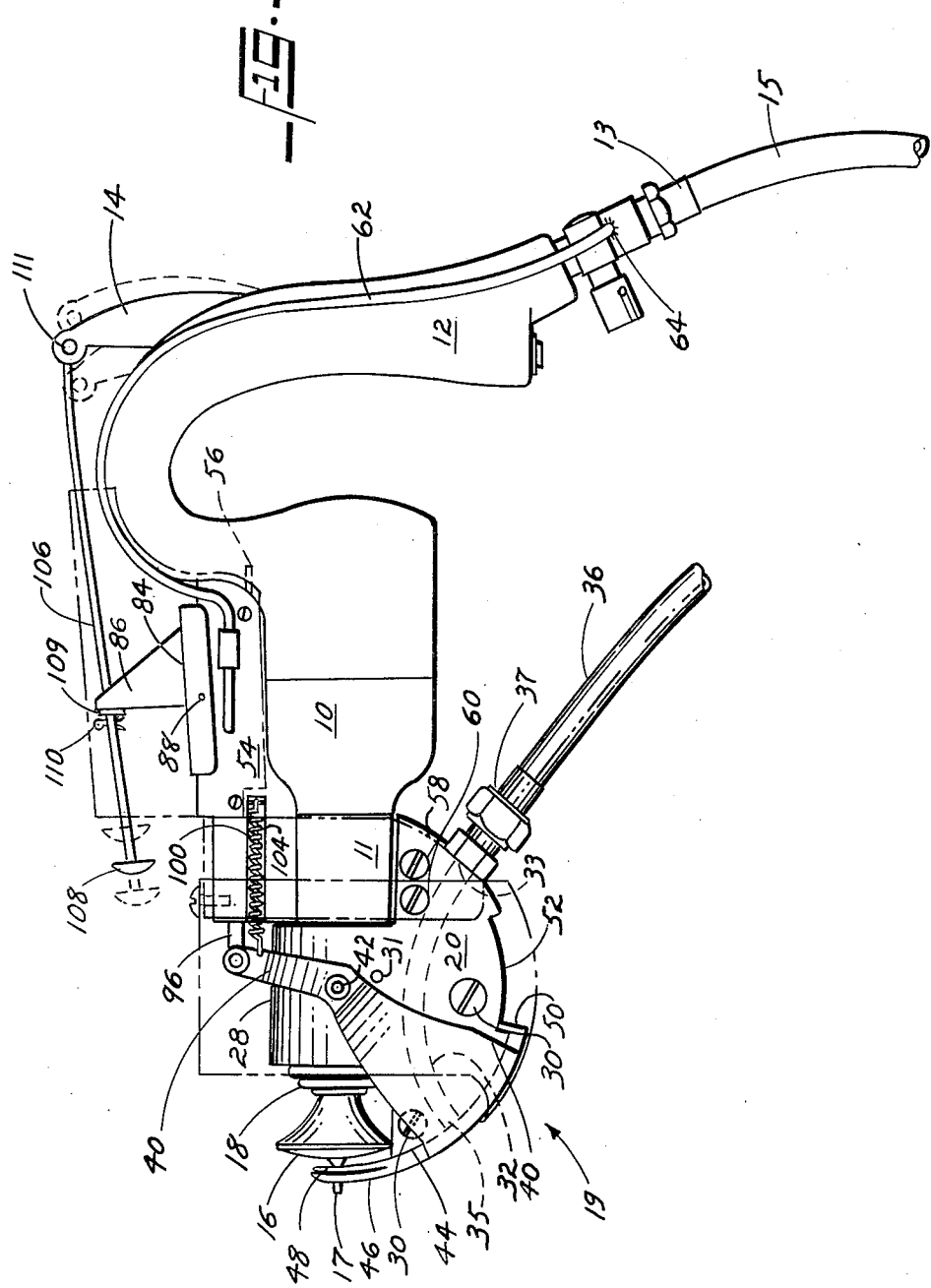

2,506,994

UNITED STATES PATENT OFFICE 2,506,994

PNEUMATICALLY OPERATED RIVET FEED

Charles Chadwick, South Gate, Calif., assignor to Douglas Aircraft Company, Inc., Santa Monica, Calif.

Application August 21, 1944, Serial No. 550,435

5 Claims. (Cl. 78—48)

This invention relates to an attachment for pneumatic tools, which functions to mechanically supply small headed fasteners with elongated shanks, such as rivets or screws, to the driving end of the tool in a simple and efficient manner.

In certain types of fabrication of sheet metal structures and of assembly of small structural members, a large number of rivets are driven with small manually controlled pneumatic guns. The center of gravity of these relatively heavy guns is in front of the gun handle, requiring the operator to support the forward end of the gun with one hand while holding the handle of the gun with his other hand. Neither hand, then, is available for placing the rivets in position in the work preparatory to the driving operation. Also in aircraft work, particularly in the fabrication of wings and fuselages, it is often necessary to place rivets in the structure where the operator must reach through lightening holes or for other reasons work in a confined space to set the rivets. It then becomes difficult or even impossible to hold the rivet gun with one hand and place the rivet in a drilled hole with the other.

This invention has as one object the obviation of these difficulties by the provision of means for mechanically placing the rivets in position for the driving operation, freeing both hands for the handling of the gun.

Another object of the invention is to provide an improved magazine feeding attachment for a pneumatic fastener driving tool, and particularly a hand operated tool of this character.

Another object of the invention is to provide a simple easily operated device for mechanically supplying small, headed, elongated, fasteners in a shank first position in alignment with the driving tool preparatory to setting.

Still another object of the invention is to provide a fastener feeding attachment which may be fitted and secured to a pneumatic, fastener driving, tool without structural modification of the tool.

Another object of the invention is to provide a fastener feeding attachment for fastener driving, pneumatic, tools which can be readily applied to a variety of such tools.

Another object of the invention is to provide an interlocking control of the feeding and driving mechanisms which prevents harmful interference therebetween.

Still another object of the invention is to provide a means of mechanically positioning small fasteners in direct alignment with the operating member of the tool so that it is unnecessary to laterally shift the tool to squarely drive the fastener into place, after it has been positioned in the fastening hole in the work structure, as is necessary with hand placing of the fasteners.

A still further object of the invention is to provide a feeding attachment for fastener driving pneumatic tools which enables the operator to drive rivets more rapidly and with less effort than is otherwise possible.

Other objects will be apparent from the following disclosure of an embodiment of the invention. The invention inheres in the novel construction, arrangement, and combination of parts and elements herein disclosed, and is illustrated in one embodiment in the accompanying description and drawings. It is not limited to this embodiment but is defined in the appended claims.

In the drawings, which are for illustrative purposes only,

Figure 1 is a side elevation of a gun pneumatic fastener driving tool in the form of a rivet setting gun, showing an attachment of this invention in position on the tool.

Figure 2 is a fragmentary view of the attachment showing the control device partially in section.

Figure 3 is a fragmentary view of the forward portion of the gun feeder showing the housing of the attachment in section and illustrating the manner in which the transfer mechanism receives rivets from the feeder conduit.

Figure 4 is a perspective view of the feeder housing.

Figure 5 is a perspective view of the transfer arm.

Figure 6 is an exploded perspective view of the control device shown in Figure 2.

A standard type riveting tool or gun shown in the several views has a barrel 10, pistol type grip handle 12, air inlet 13 connected to an air pressure hose 15, rivet set 16, set retaining spring 18, and gun operating lever or trigger 14. The trigger when manually pushed forward from the position shown in full lines in Figure 1 admits air through a valve (not shown) in the handle 12 to the barrel 10, in which is mounted the usual mechanism (not shown) for projecting forwardly the rivet set 16 usually in an automatically effected sequence of multiple shots to drive into position and upset a rivet 17 held in position in front of the set, all in accordance with well known, and standard, rivet gun construction. This invention relates to an attachment for mechanically placing rivets in position in front of the set 16 in lieu of the usual method of hand placement of the rivets.

The rivet feed attachment consists of the feeding and placement mechanism 19 and the control device therefor 22. The feeding and placement mechanism 19 consists of a block 20 and a transfer member 34. The block 20 is of split character, having two symmetrically formed complementary halves 24 and 26 (see Figure 4) secured together by screws 30, in clamped position on the forward portion 11 of reduced diameter of the barrel 10. The block 20 is held from turning on the barrel portion 11 by a pin 31 which engages a transverse groove (not shown) in the under surface of the barrel portion 11.

Each half of the split block 20 is formed to have a lower vertical plate portion 21 and a semicylindrical upper clamp portion 28. The clamp portion 28 conforms to the barrel portion 11 of the gun. The plate 21 has an upper horizontal straight edge face which fits against the under surface of the barrel portion 11 and a lower arcuate edge face 44 centered upon an axis 42 on the side of the barrel portion 11 at the level of the axis thereof. Each of the half portions 24 and 26 of the block 20 is provided with a semi-cylindrical groove, these two grooves forming a rivet feeding bore or conduit 32 which extends in an upwardly bowed curve from an inlet 33 in the rear portion of the edge face 44 of the block 20 to an outlet 35 in the front portion of the edge face 44 of the block 20, the axis outlet being substantially perpendicular to the edge face 44. At the inlet 33 a connection 37 secures a rivet supply tube 36 to the block 20. Rivets are fed and urged through the tube 36 and the bore 32 shank first in single file alignment from any suitable source such as a rivet magazine. Various devices have been developed for properly aligning the rivets shank first and moving them through a feeder tube in such alignment.

The transfer member 34, as clearly shown in Figure 5 has a carrier 38 and a bifurcated arm 40 secured to the carrier and hinged intermediate its ends to the upper portion 28 of the clamp member on the axis 42. The carrier is arcuate in elevational contour, conforming to the arcuate edge face 44 of the block 20, its inner face sliding along the edge face 44. The carrier is mounted to slide proximately along the face 44 of the block 20. The forward end of the carrier is longitudinally slotted to provide fingers 46 spaced apart to snugly receive a rivet shank. The fingers 46 are spaced from the edge face 44 to accommodate a pair of similar fingers 48 of resilient material which are radially aligned with the fingers 46 about axis 42 and press inwardly against the edge face 44 of the split block 20 as the transfer member rotates about its axis 42.

The transfer member is limited in its rearward movement by the engagement of a radially inwardly projecting lug 50 at the rear end of the carrier 38 with the rear end wall 51 of an inset circumferentially extending recess 52 in the edge face 44 of the block 20, and is limited in its forward movement by the engagement of this lug with the forward end wall 53 of the recess 52. At the rearward limit of movement of the carrier the fingers 46 and 48 are in position to receive an outwardly pushed rivet 55 from the conduit 32 and hold it with the rivet head between the resilient fingers 48 and the edge face 44 and with the shank projecting forwardly through the two sets of fingers. At the forward limit of movement of the carrier the fingers 46 and 48 hold the rivet with the rivet head against the set 16 and the shank projecting forwardly in axial alignment with the set in readiness for insertion of the shank into the rivet holes of the work articles to be fastened together.

With the carrier in the forward limit position, the operator places the rivet shank in the rivet holes by holding the gun in approximately the right position for insertion of the shank and shifting the gun barrel laterally until the shank is in exact alignment with the rivet holes and thereafter pushing the gun forward until the rivet shank is seated in the rivet holes. The carrier of course had, when it was in the retracted position shown in Figure 3, already first received a rivet from the conduit outlet 35, and had then moved it to position in front of the set. After the rivet is inserted in the rivet holes, the carrier is retracted to its rearward position to receive the next rivet and while thus retracted the set is operated to upset the rivet in the rivet holes. This sequence and the co-ordination of movement of the carrier and the rivet set is accomplished by a control device which will next be described.

The control device 22 consists of a block 54 and the moving parts of the control device which are mounted within and upon it. The block 54 is secured to the gun by a yoke strip 58 shown in phantom lines which lies against the top of the forward end of the block and extends downwardly upon either side of the block and below the block where it is secured to the plate portions 21 of the block 20 by screws 60. The block 54 is formed with a cylindrically shaped lower surface to conform to the top of the barrel 10 of the gun and is held at its rear end against upward displacement from the gun barrel by pins 56 secured to the grip 12 and seated in corresponding sockets in the rear face of the block 54.

The forward portion of the blocks 54 is formed with a cylinder bore 68 in which reciprocates a piston plunger 70. A connecting rod 96 is pivotally connected to the piston plunger 70 at its rear end and to the upper end of the transfer arms 40 at its forward end. The upper end of the transfer arms 40 and piston 70 are normally held to their rearmost position, in which the fingers 46 and 48 are in front of the set 16, by tension springs 100 which are accommodated in grooves 104 on either side of the block 54 and are anchored to the block at their rear ends and secured to the arms 40 at their forward ends. These springs hold the fingers 46 and 48 in front of the rivet set 16 except when the piston 70 is thrust outwardly by air pressure in the cylinder behind the piston.

An air inlet tube 62 connects an inlet passage 66 in the block 54 with the main air supply within the handle of the gun at 64, the passage 66 being thus always under pressure. An air passage 74 opens into the cylinder bore 68 at its forward end and is connected at its rear end with an exhaust passage 78 and at an intermediate point with the high pressure passage 66. The former connection is closable by a spring ball valve 80 and the latter connection by a spring ball valve 82. A rocker 84 having a lever 86 is pivotally mounted at 88 on the upper surface of the block 54 and is designed, by means of pin 90 in the exhaust port 78 and pin 92 snugly slidable in a bore 94 to alternatively open the ball valves 80 and 82. The rocker 84 by means of a compression spring 89 is normally held in the position shown in Figure 2 in which position air pressure is admitted through ball valve 82 to thrust the piston 70 forward and hold the transfer member in its rearward position in the rivet pickup relation to the block 20.

When, now, the operator wishes to place a rivet in position for the upsetting operation, a rod 106 is pushed rearwardly by pressing the button 108 on the forward end of the rod to the rear, with a finger of the hand of the operator which is supporting the forward end of the gun. Rod 106 passes loosely through a hole in the upper end of lever 86. Rearward movement of the rod 106 causes a stop 110 and washer 109 on the rod to swing the rocker lever 86 rearwardly to move pin 92 upwardly and allow the ball valve 82 to close and pin 96 to open the ball valve 80. The springs 100 then retract the piston 70, exhaust air being ejected from the bore 68 through passage 74 and exhaust passage 78, the pin 90 being flattened on one side to provide for movement of air through the passage 78. The rivet holding fingers are thus moved upwardy to place a rivet in position for driving by the rivet set. With the rod 106 held rearward the operator manipulates the gun to place the rivet in the rivet hole. When this is done, release of pressure on the button 108 allows spring retraction of the rocker 84 and causes the piston 70 to be thrust forward to retract the transfer mechanism to the rivet pickup position, out of the way of the rivet setting operation which is then accomplished by a forward push by the thumb of the operator on lever 14, admitting air pressure to the barrel of the gun.

The rear end of the rod 106 is pivoted to the gun operating lever 14 and the stop 110 is so placed that when the gun lever is in its gun valve closing position, this stop is in contact with the lever 86 when the rocker is in its spring biased position. The gun lever 14 may move rearwardly a small increment of idle movement during which the gun valve remains closed. This permits rearward movement of the rod 106 to transfer a rivet from the outlet 35 to the rivet set 16. Forward movement of the lever 14 from its rearmost position first allows a tilting of the rocker 86 to retract the transfer member to its lower position out of the way of the rivet set, and then as it is thust to its forwardmost position operates the rivet set. The transfer member may be moved upwardly by a pull on the lever 14 instead of a push on the rod 106.

The operation of the gun and rivet feeding attachment is apparent from the foregoing structural description of the invention. With the parts in the position shown in Figure 1, the rod 106 is manually moved rearwardly, opening the ball valve 80 and closing the ball valve 82, thereby permitting the springs 100 to move a rivet to position in front of the rivet set. At the same time the lever 14 moves to the rearward dotted line position shown in Figure 1. The operator with the rod held in its rearmost position, now manipulates the gun to insert the rivet in the rivet hole. He then releases manual pressure on the rod 106, permitting the spring 89 to move the rocker to its normal position in which it opens valve 82 and closes valve 80, causing the transfer member to assume its lower position, in which it is out of the way of the rivet set, and in which it picks up the next rivet. At this time the lever 14 moves back to the position shown in full lines in Figure 1. A forward thrust on the trigger 14, then operates the rivet set, the stop 110 moving forwardly of the lever 86 without effect thereon. The position of the trigger 14, rod 106, stop 110 and button 108 is then as shown in dotted lines in Figure 1.

I claim:

1. A device for feeding fasteners to a predetermined fastener-driving location to enable them to be driven, comprising: a pneumatic feeder conduit adapted to be operated pneumatically from an exterior source for conducting a row of the fasteners shank first, the feeder conduit terminating at a locus radially offset from the line along which the fastener is to be driven; a transfer member having a forked holder formed to receive the fasteners singly from the feeder with the fastener heads to the rear and constructed and operable to bodily lift and carry the fasteners in transference and movable between a first travel limit and a second travel limit to reciprocate the holder between the locus when at the first travel limit and a position immediately in front of and axially aligned with the line along which the fastener is to be driven when at the second travel limit in which the fastener head is toward the point where the fastener is to be impacted; resilient means for holding the transfer means at its second travel limit; a pneumatic cylinder-piston motor opposed to said resilient means for moving the transfer means to its first travel limit; a manually operable valve device for alternatively applying air pressure to, and exhausting air from said motor; and a right-angled-arm bearing lever for said valve device, spring biased to hold the valve device in the pressure position, and means extending rearwardly from said arm and enabling said arm to be connected to the actuating member of a fastener-driving instrumentality and engaging near the one end against said arm.

2. An appliance for feeding fasteners to a predetermined location to enable them to be driven, comprising: a pneumatic feeder conduit adapted to be operated pneumatically from an exterior source for conducting a row of the fasteners shank first, the feeder conduit terminating at a locus radially offset from the line along which the fastener is to be driven; a transfer member having a forked holder formed to receive the fasteners singly from the feeder with the fastener heads to the rear and constructed and operable to bodily lift and carry the fasteners in transference and movable between a first travel limit and a second travel limit to reciprocate the holder between the locus when at the first travel limit and a position immediately in front of and axially aligned with the line along which the fastener is to be driven when at the second travel limit in which the fastener head is toward the point where the fastener is to be impacted; resilient means for holding the transfer means at its second travel limit; a pneumatic cylinder-piston motor opposed to said resilient means for moving the transfer means to its first travel limit; a spring-closed, plunger-opened ball-valve normally seated in closed position in the air path to said cylinder-and-piston motor; another spring-closed, plunger-opened ball balve disposed to the rear of the first-said valve and flow-connected, on the one side, to the air path from said motor, and connected, on the other side, to atmosphere and also normally occupying a closed position; a manually operable lever pivotally mounted superadjacent the plunger of said valves and spring biased at the rear end thereof to tilt forwardly and contact the plunger of the first said ball valve to open said valve; and a link member extending rearwardly from said lever and capable of enabling engagement of said lever with the triggering arm of a fastener-driver instrumentality and engaging near the one end against said pivotally mounted lever and pivotally connectible at the other end to such triggering member.

3. A device for feeding fasteners to a predetermined driving location to enable them to be driven, comprising: a housing, the lower edge face of said housing being arcuate in elevation profile and said housing being provided with a pneumatic feeder conduit adapted to be operated pneumatically from an exterior source, said conduit having an outlet at the forward portion of said lower edge face of said housing in the central vertical longitudinal plane thereof, said conduit being suitable for conducting a row of the fasteners to emerge in single file through said outlet, shank first; an arm pivoted intermediate of its ends to the side of the housing on an axis above said arcuate edge face and centered with respect to said edge face; a fastener carrier mounted on the lower end of said arm proximate said lower edge face and arranged to receive the fasteners emerging from said outlet one at a time and hold them with their heads directed inwardly toward said lower edge face of the housing and constructed and operable to seize, bodily lift, and suspendedly carry the fasteners from the supply thereof to the driving zone; a first stop limiting downward movement of the lower end of said arm to position the carrier in radial alignment with said outlet; a second stop limiting upward movement of the lower end of said arm to position the carrier axially in front of said driver, said driver in the initial position of its operative cycle being arranged to be proximately behind said carrier when the lower end of the arm is in its upward position; and a control device securable on top of the housing and connected to the upper end of the arm for angularly reciprocating the arm between said stops in cyclic correlation with the operative movements of the driver.

4. A device for feeding fasteners to a predetermined location to enable them to be driven, comprising: a housing including a pneumatic feeder conduit adapted to be operated pneumatically from an exterior source and organized therewith to automatically conduct forwardly a line of fasteners continuously disposed shank-first, said conduit terminating at a locus arcuately downwardly offset from the driving point; a fastener transporting arm pivoted, in a generally upright attitude intermediate its upper and lower ends to said housing with its upper end extending thereabove, for forward and backward angular reciprocation outside the lower periphery of said housing and organized with said conduit to, when in its rearward position, separately grasp and remove the fasteners at the front upper portion of its lower end singly and shank-forwardly from the forward end of said conduit and organized and operable to lift and suspendedly carry said fasteners bodily from said forward end to the driving zone; resilient means attached at the one end to the upper end of said transporting arm and anchored at the other end to an adjacent abutment forming a cooperating part of the feeding device and adapted to be supported rearwardly above the point at which the fastener is to be impacted, whereby the transporting arm is normally held in a fastener delivering attitude with its seizing end aligned with the point at which the fastener is to be impacted; a fluid motor having a piston connected to the upper end of said transporting arm and arranged in opposition to said resilient means, said motor including inlet and exhaust passages connectible to a source of fluid power; spring-closed, plunger-opened fluid pressure inlet and outlet control valves interposed in said passages so as to enable alternative application of pressure to, and exhaust of fluid pressure from, said piston; a manually operable, lateral-arm bearing lever pivotally mounted in juxtaposition to the upper ends of the plungers of said plunger-opened valves and spring biased upwardly at its rear end; and a rearwardly extending link slidably and abuttedly engaged with said arm and having its rearmost end adapted to be pivotally connected to the activating means of a fastener driving device, and manually operable alternatively to open said pressure inlet valve and close said pressure outlet valve, and to close said inlet valve and open said outlet valve; whereby respectively to move the seizing end of said arm away from alignment with said point at which the fastener is to be impacted to the forward end of said conduit to seize and hold a fastener stationary outside the conduit when said impact zone is reciprocating, and to return said arm, independently of fluid pressure, from said conduit to said point at which the fastener is to be impacted carrying a fastener bodily supportedly outside the conduit shank-forwardly to said point at which the fastener is to be impacted when the impact zone is stationary.

5. A device for feeding fasteners to a predetermined location to enable them to be driven by an instrumentality that includes a member for initiating its action, comprising: a first housing, the lower edge face of which is arcuate in elevational profile, said housing including a pneumatic feeder conduit adapted to be operated pneumatically from an exterior source and having an outlet at the forward portion of the lower edge face of said housing in substantially the vertical, central, longitudinal plane thereof, said conduit being organized and operative to conduct a line of fasteners therethrough to emerge shank first successively through said outlet; an arm pivoted intermediate its ends to the side of said housing on an axis above said arcuate edge face and centered with respect to said edge face; a fastener carrier mounted on the lower end of said arm; and a control device for angularly reciprocating said arm between fastener-seizing and fastener-delivering positions in cyclic correlation with the operational motions of the fastener driving instrumentality, said control device including a second housing disposed mainly to the rear of the first housing and lying mainly above same; resilient means carried by said second housing and effective to rearwardly retract the upper end of said arm; an air operated plunger connected to said end of said spring loaded arm and operative to thrust said end forwardly; spring biased "walking beam" type valve means carried by the second housing for applying air pressure to said plunger; manually operable means active on said beam to overcome the spring biasing effect thereon and relieve said plunger of air pressure; and a link-member extending rearwardly from said pressure-relieving means and slidably and abuttingly associated therewith and capable of connection to the means for initiating the fastener-driving operation.

CHARLES CHADWICK.

REFERENCES CITED

The following references are of record in the file of this patent:

UNITED STATES PATENTS

| Number | Name | Date |
|---|---|---|
| 1,753,499 | Burger | Apr. 8, 1930 |
| 1,921,485 | Seger | Aug. 8, 1933 |
| 2,056,559 | Berliner | Oct. 6, 1936 |
| 2,273,454 | Ward | Feb. 17, 1942 |
| 2,335,670 | Harvey | Nov. 30, 1943 |
| 2,368,847 | Koehler | Feb. 6, 1945 |